United States Patent [19]

Zerb

[11] 3,774,731

[45] Nov. 27, 1973

[54] VIBRATION DAMPER

[75] Inventor: Donald L. Zerb, 4323 117th St., Edmonton, Alberta, Canada

[73] Assignee: William M. Varty, Edmonton, Alberta, Canada, part interest.

[22] Filed: Sept. 19, 1972

[21] Appl. No.: 290,407

Related U.S. Application Data

[63] Continuation of Ser. No. 154,578, June 18, 1971.

[52] U.S. Cl.................. 188/1 B, 267/141, 408/143
[51] Int. Cl.............................................. F16f 7/00
[58] Field of Search...................... 175/56; 188/1 B; 267/141; 408/143

[56] References Cited
UNITED STATES PATENTS

| | | | |
|---|---|---|---|
| 2,969,416 | 1/1961 | McGavern...................... | 188/1 B X |
| 3,437,332 | 4/1969 | Lee ................................. | 188/1 B X |
| 3,559,512 | 2/1971 | Aggarwal........................... | 408/143 |

Primary Examiner—Duane A. Reger
Attorney—William Millen et al.

[57] ABSTRACT

The invention provides an improved vibration damper primarily for use with a drill of the type used in drilling for oil and gas. The improved damper includes an elongated metallic sleeve assembly slidably housed in an outer casing assembly. The assemblies have cooperating longitudinally extending splines which prevent rotation of one assembly relative to the other but permit relative longitudinal motion. A plurality of rubber bushes are housed between the outer casing assembly and the sleeve assembly and separated by contoured rings which provide clearance for deformation on the bushes. The assemblies and bushes are arranged so that compressive shock forces deform the bushes thereby limiting the vibrations applied to the drill string and hence to the drilling rig.

11 Claims, 3 Drawing Figures

INVENTOR.
DONALD L. ZERB

BY Rogers, Bereskin & Parr

VIBRATION DAMPER

This is a continuation, of application Ser. No. 154,578, filed June 18, 1971.

This invention relates to an improved vibration damper for use primarily with a drill of the type used in drilling for oil and gas.

Drill bits are subject to shock loads which cause strong vibrations in the drill bit and in the associated drill string. These vibrations can be sufficiently damaging that the speed of feed and rotation of the drill bit must be reduced to avoid damage to the drill bit and to the drilling rig. It is therefore desirable to include a vibration damper in the drill string to limit the vibration transmitted to the drilling rig and also to reduce the inertia shock when the drill bit strikes rocks and the like.

Numerous vibration dampers have been designed for this purpose and they include types having springs, fluid systems, and a more recent type having rubber bushings. The present invention is of the last type.

Vibration dampers having rubber bushings fall into two main types. The first type has a heavy annular rubber bush which is positioned between and bonded to inner and outer co-axial, cylindrical members such that the outer member transmits torsional forces through the bush to the inner member which is connected to the drill bit. The torsional forces create shear stresses in the bush, and if the bush fails, the damper must be repaired by bonding a new bush to the inner and outer members. This repair is relatively costly and requires specialized equipment. Furthermore, this type of damper is relatively inefficient in damping logitudinal vibrations.

A second vibration damper of the rubber bush type incorporates a number of free bushes and a longitudinally extending spline for preventing rotational movement between outer and inner co-axial, cylindrical members. As the members move longitudinally relative to one another, the rubber bushings are deformed to absorb longitudinal shock energy and to dampen vibrations throughout the drill string. However, under heavy duty, this type of damper tends to transmit larger shock forces because the rubber bush will not permit sufficient relative axial movement between the inner and outer members. It is therefore an object that the present invention to provide a vibration damper which will permit sufficient axial movement between the drill bit and the drill string to dampen larger vibration forces.

According to a particular preferred embodiment of the present invention, an improved damper is provided having an elongated metallic sleeve assembly slidably housed in an outer casing assembly. The assemblies have co-operating longitudinally extending splines which prevent rotation of one assembly relative to the other but permit relative longitudinal motion. A plurality of rubber bushes are housed between the outer casing assembly and the sleeve assembly and separated by contoured rings which provide clearance for deformation of the bushes. The assemblies and bushes are arranged so that compressive shock forces deform the bushes thereby limiting the vibrations applied to the drill string and hence to the drilling rig.

The invention will be better understood with reference to the drawings, wherein.

Figure 1:
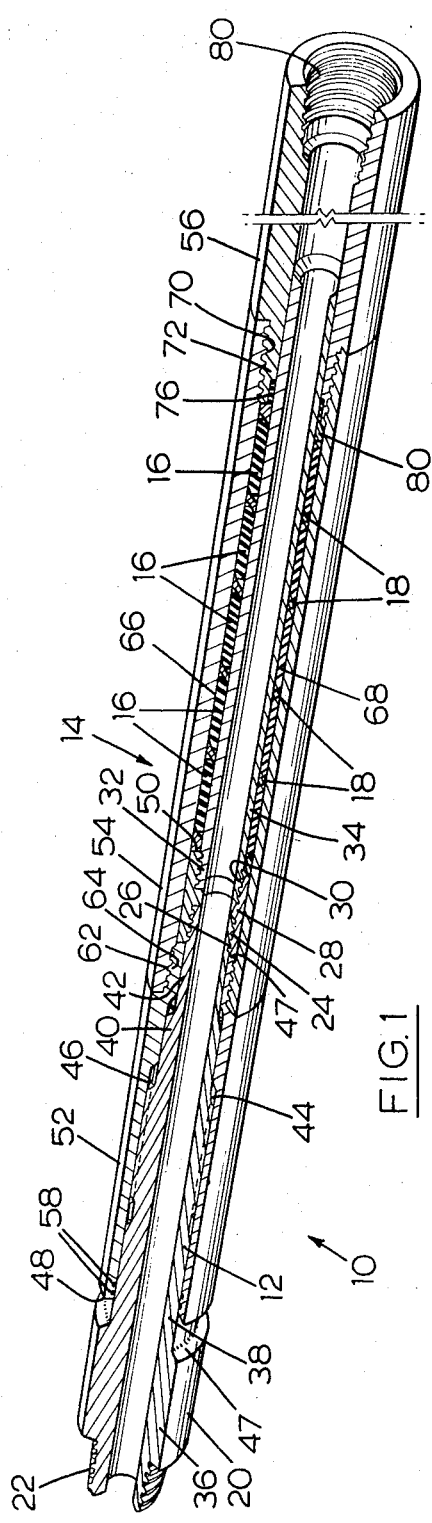
FIG. 1 is a partially sectioned perspective view of a vibration damper according to the invention.
Figure 2:
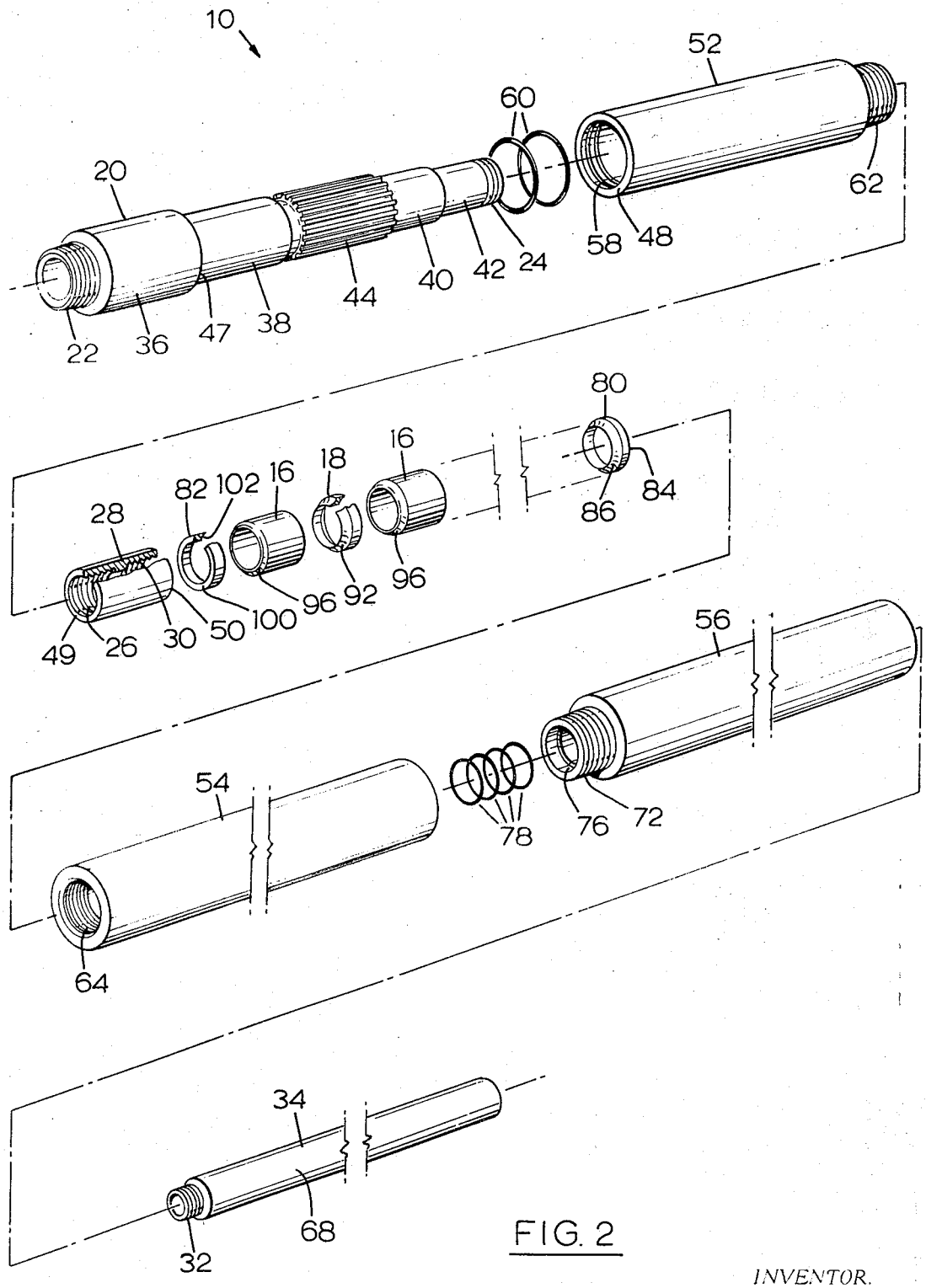
FIG. 2 is an exploded perspective view of the vibration damper.

Reference is first made to FIGS. 1 and 2 with particular reference to FIG. 1. The vibration damper 10 consists of a sleeve assembly 12 slidably positioned in an outer casing assembly 14. For improved clarity, numerals in FIG. 1 which refer to parts of the casing will be located above the damper 10, and numerals referring to parts of the sleeve assembly will be located below the damper 10. Five rubber bushes 16 are located about the sleeve assembly 12 and inside the casing assembly 14 and are separated by contoured rings 18 such that upon shock movement of the sleeve assembly 12 into the casing assembly 14, the bushes 16 absorb some of the force of the shock.

The sleeve assembly 12 consists of a lower sleeve 20 having a threaded lower end 22 for connection to a drill bit (not shown) and a threaded upper end 24 adapted to threadably engage in a lower recess 26 of a connector 28. A threaded upper recess 30 in the connector 28 receives a threaded lower end 32 of an upper sleeve 34 which extends through the bushes 16 and rings 18.

The lower sleeve 20 consists of an enlarged cylindrical portion 36 adjacent the threaded lower end 32 and stepped cylindrical portions 38, 40, and 42. The portion 38 is machined to form external spines 44 for mating with internal spines 46 in the casing assembly 14. The enlarged cylindrical portion 36 is positioned relative to the spines 44, 46 so that an upper face 47 of the portion 36 will abut at corresponding lower face 48 of the casing assembly 14 to prevent excessive longitudinal motion resulting in possible damage to the spines and other parts.

Connector 28 presents a lower face 49 which prevents separation of the sleeve assembly from the casing assembly 14 as will be described, and an upper face 50 for applying compressive force on the bushes 16 and rings 18 under the influence of shock loading.

The outer casing assembly 14 consists of lower, intermediate and upper members 52, 54 and 56, each of which has a similar outer diameter for presenting a continuous cylindrical outer appearance. The lower member 52 includes stepped inner diameters for slidably engaging respective cylindrical portions 38, 40, 42 of the lower sleeve 20 and the internal spines 46 as previously described. The lower end of member 52 has internal annular recesses 58 for receiving O-rings 60 (FIG. 2) to prevent drilling mud entering the spines 44, 46, and the upper end of member 52 terminates in a threaded projection 62 for engaging in a threaded recess 64 at a lower end of intermediate member 54. The upper end of the member 52 abuts against lower face of 49 of connector 28 to prevent separation of the sleeve assembly 12 from the outer casing assembly 14.

Intermediate member 54 is slidably engaged on the connector 28 and defines an annular chamber between an inner wall 66 of the member 54 and an outer surface 68 of the upper sleeve 34 for containing the rubber bushes 16 and rings 18. An internal thread 70 is formed adjacent upper end of member 54 for receiving a lower threaded projection 72 of the upper member 56. The lower end of the member 56 is recessed at 76 to include sealing rings 78 (FIG. 2) for preventing drilling mud from entering into the chamber containing the bushes 16 and rings 18. A threaded recess 80 is provided in the upper end of the member 56 for receiving the lower end of a drill string.

Figure 3:
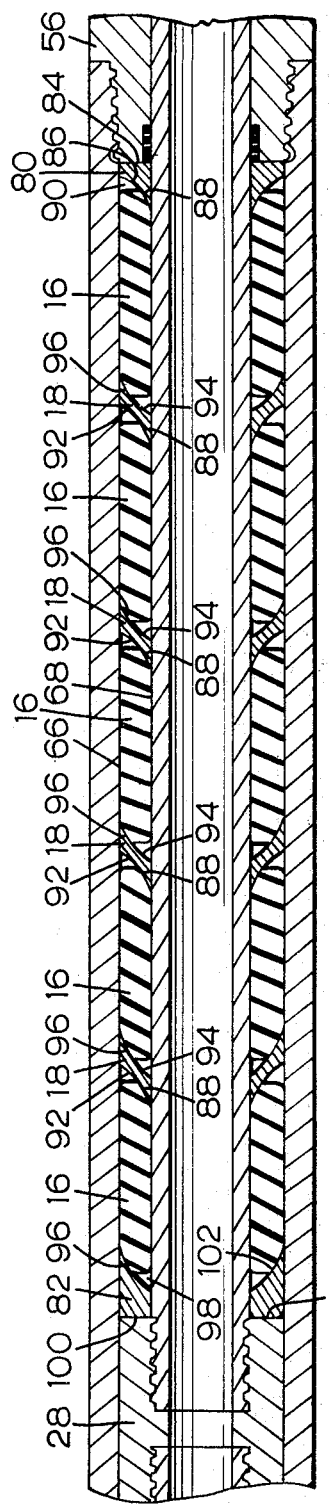
FIG. 3 is a sectional side view of a part of the vibration damper.

The rings 18 and bushes 16 are shown in greater detail in FIG. 3. As will be seen in this Figure, there are five annular bushes 16 separated one from another by four annular contoured rings 18 and from the upper member 56 by an upper ring 80 and from the connector 28 by a lower ring 82. The upper ring 80 has an upper, radial abutment face 84 for engaging against a lower end of the member 56 and a concave lower face 86 which curves upwardly and outwardly for contacting a rounded portion 88 at the upper end of an adjacent bush 16. A relatively small annular cavity 90 is defined between the end ring 80 and the adjacent bush 16 so that when the bushes are compressed the adjacent bush can deform taking up at least some of the space afforded by the cavity 90.

Each of the rings 18 includes a concave lower face 92 which is curved upwardly and outwardly and is similar in profile to the face 86 of end ring 80 and combines with a rounded portion 88 of a respective bush 16 to define a cavity 90. Concave upper faces 94 of rings 18 have similar profiles to face 92 but are reversed so that they curve downwardly and inwardly for combining with lower rounded portions 96 of respective lower ends of adjacent bushes 16 to define annular cavities 98.

The lower ring 82 has a radial abutment face 100 for engaging against upper face 50 of connector 28 and an upper face 102 which is similar in shape to faces 94 on rings 18 and defines a further cavity 98.

In use, when the drill exerts an upward force on the drill string, the bushes 16 are deformed into cavities 98 and 90 thereby permitting the sleeve assembly to move upwardly relative to the outer casing assembly for absorbing longitudinal shocks to limit the forces applied to the drill string.

One of the features of the present invention is that it can be assembled from the upper end. Firstly, the rings 58 are inserted in the lower member 52 which is then moved axially over the lower sleeve 20 until it meets the upper face 46 of the enlarged cylindrical portion 36. Next, the connector 28 is threaded onto the upper end 24 of the lower sleeve 20 and then the upper sleeve 34 is threaded into the connector 28. The intermediate member 54 is then threaded onto the lower member 52 and the rings 82, 18 and 80 together with bushes 16 are moved into the chamber between the intermediate member and the upper sleeve in the arrangement shown in FIG. 3. The assembly is completed by positioning the sealing rings 78 in the recess 76 of the upper member 56 and then threading the upper member into the intermediate member 54.

The sleeve assembly is positioned within the casing assembly and is prevented from separating from the casing assembly by the connector 28 which limits downward movement of the sleeve assembly relative to the casing assembly, and by the upper face 47 of the enlarged cylindrical portion 36 which meets the lower face 48 of the lower member 52 to prevent excessive upward displacement of the sleeve assembly relative to the casing assembly.

The arrangement of rings and bushes as shown in FIG. 3 can be reversed if preferred so that the ring 80 will then be the lower ring and the ring 82 will then be the upper ring. Also, it is possible to vary the shape of the rings and yet retain cavities such as cavities 90 and 98. Such variations would be within the principle of the invention which is to provide space to permit the bushes 16 to deform thereby allowing relatively large axial movement of the drill bit relative to the drill string for absorbing a large proportion of the reactive shocks applied on the drill bit.

The bushes 16 may be a relatively loose fit in the chamber between inner surface 66 of member 54 and outer surface 68 of sleeve 34 to provide further space to deform the bushes 16. Also further energy can be dissipated by making the rings 18 a friction fit on surfaces 66, 68.

What I claim as my invention is:

1. A damper for damping longitudinal shocks in a drill string, said damper comprising:

a sleeve assembly having upper and lower ends;

a casing assembly co-axial with said sleeve assembly;

spline means slidably connecting said sleeve assembly and said casing assembly to permit relative longitudinal motion of said sleeve assembly and said casing assembly and to transmit torsional forces from one of said casing assembly and said sleeve assembly to the other of said casing assembly and said sleeve assembly, said sleeve assembly and said casing assembly defining an annular chamber;

resilient damping means positioned in said chamber and comprising at least one annular bush; and means defining a face in contact with a portion of the bush adjacent an end of the bush, there being an annular cavity between said end of said bush and said face to permit deformation of said bush such that when a longitudinal shock forces said sleeve assembly axially into said casing assembly, said bush is deformed into said annular cavity to dissipate at least a part of the energy of said shock; and means for limiting the relative longitudinal motion of said sleeve assembly and said casing assembly.

2. A damper as claimed in claim 1 in which said chamber terminates at its lower end in an upwardly exposed face of said sleeve assembly and at its upper end in a downwardly exposed face of said casing assembly, and in which said face in contact with said portion of said bush is concave and is fixed relative to one of said upwardly exposed face and said downwardly exposed face.

3. A damper as claimed in claim 2 in which said bush is one of a plurality of bushes and said damper further comprises a plurality of contoured rings, each of said rings being positioned in said chamber between adjacent bushes and having upper and lower faces in contact with portions of said adjacent bushes adjacent respective lower and upper ends of said adjacent bushes, each said contoured ring and said adjacent bushes defining further annular cavities into which said adjacent bushes may be deformed.

4. A damper as claimed in claim 3 in which said fixed face is formed on an upper end ring, said end ring being in contact with said downwardly-exposed face, and said damper further comprising: a lower ring in contact with said upwardly-exposed face and having a concave upper face in contact with a portion of a lowermost one of said bushes adjacent an end of said lowermost bush, the lower ring and the end of the lowermost bush defining a further annular cavity into which said lowermost bush may be deformed.

5. A damper as claimed in claim 1 in which each said portion of said bushes is rounded to match the concave profile of a ring face in contact with said portion for smoother movement of said portions of said bushes over said ring faces.

6. A damper as claimed in claim 1 in which the sleeve assembly comprises: a lower sleeve; an upper sleeve; and a connector for coupling said upper sleeve to said lower sleeve, said upwardly-exposed face being a part of said connector.

7. A damper as claimed in claim 1 in which said casing assembly comprises: lower intermediate and upper members threadably connected in variation to present a relatively smooth cylindrical outer appearance, said downwardly exposed face being a lower end of said upper member.

8. A damper as claimed in claim 2 in which each said portion of said bushes is rounded to match the concave profile of a ring face in contact with said portion for smoother movement of said portions of said bushes over said ring faces.

9. A damper as claimed in claim 2 in which the sleeve assembly comprises: a lower sleeve; an upper sleeve; and a connector for coupling said upper sleeve to said lower sleeve, said upwardly-exposed face being a part of said connector.

10. A damper as claimed in claim 2 in which said casing assembly comprises: lower intermediate and upper members threadably connected in variation to present a relatively smooth cylindrical outer appearance, said downwardly exposed face being a lower end of said upper member.

11. A vibration damper tool having first and second ends and adapted for use in a drilling string said tool comprising:

telescopically arranged tubular parts comprising an outer barrel and an inner mandrel received in the barrel, said parts cooperating to define between them an annular packing-receiving chamber, said barrel and mandrel being movable longitudinally relative to each other between a collapsed position and an extended position;

said mandrel comprising, in sequence from the first end of the tool, coupling means for operatively connecting the mandrel to the drilling string, a spacer assembly, a first spline assembly, and means defining the inner wall of the packing-receiving chamber, said coupling means, spacer assembly and first spline assembly forming an integral unit;

said barrel comprising, in sequence from the first end of the tool, means for cooperating with the spacer assembly to provide a seal against the entry of drilling mud into the first spline assembly, a second spline assembly adapted to cooperate with the first assembly to lock the parts together with reference to rotational movement while enabling them to move longitudinally relative to each other, means defining the outer wall of the packing-receiving chamber, and coupling means adapted to operatively connect the barrel to the drilling string and provide second end closure means for the chamber;

resilient, compressible packing means almost filling the chamber, said means being adapted to be compressed by normal drilling shock thrusts without permitting the casing and mandrel to strike together and to return almost instantaneously substantially to its pre-compression state;

said mandrel having a radially extending shoulder, intermediate its ends, adapted to provide first end closure means for the chamber, whereby longitudinal movement of the parts toward the collapsed position will cause the shoulder to compress the packing means against the second closure means;

means, carried by the barrel, adapted to seal the second ends of the barrel and mandrel to prevent drilling mud entering between them.

* * * * *